Figure 1:
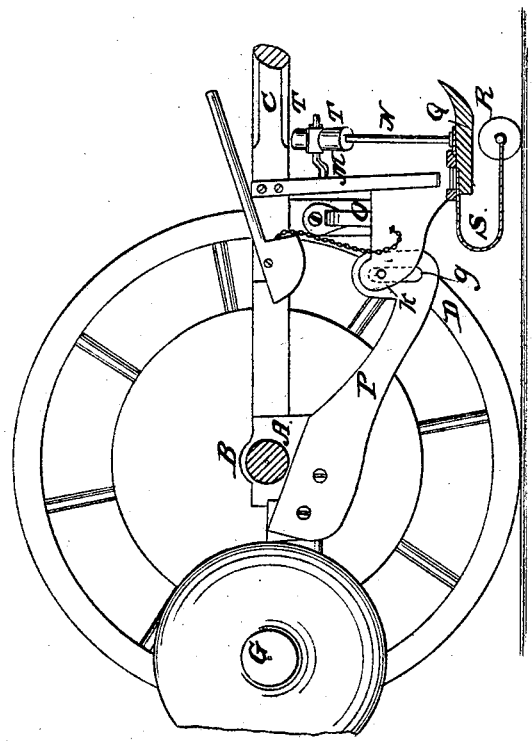

V. W. BLANCHARD.
Mower.

No. 50,441.

2 Sheets—Sheet 1.

Patented Oct. 17, 1865.

WITNESSES

INVENTOR

V. W. BLANCHARD.
Mower.
No. 50,441.
2 Sheets—Sheet 2.
Patented Oct. 17, 1865.
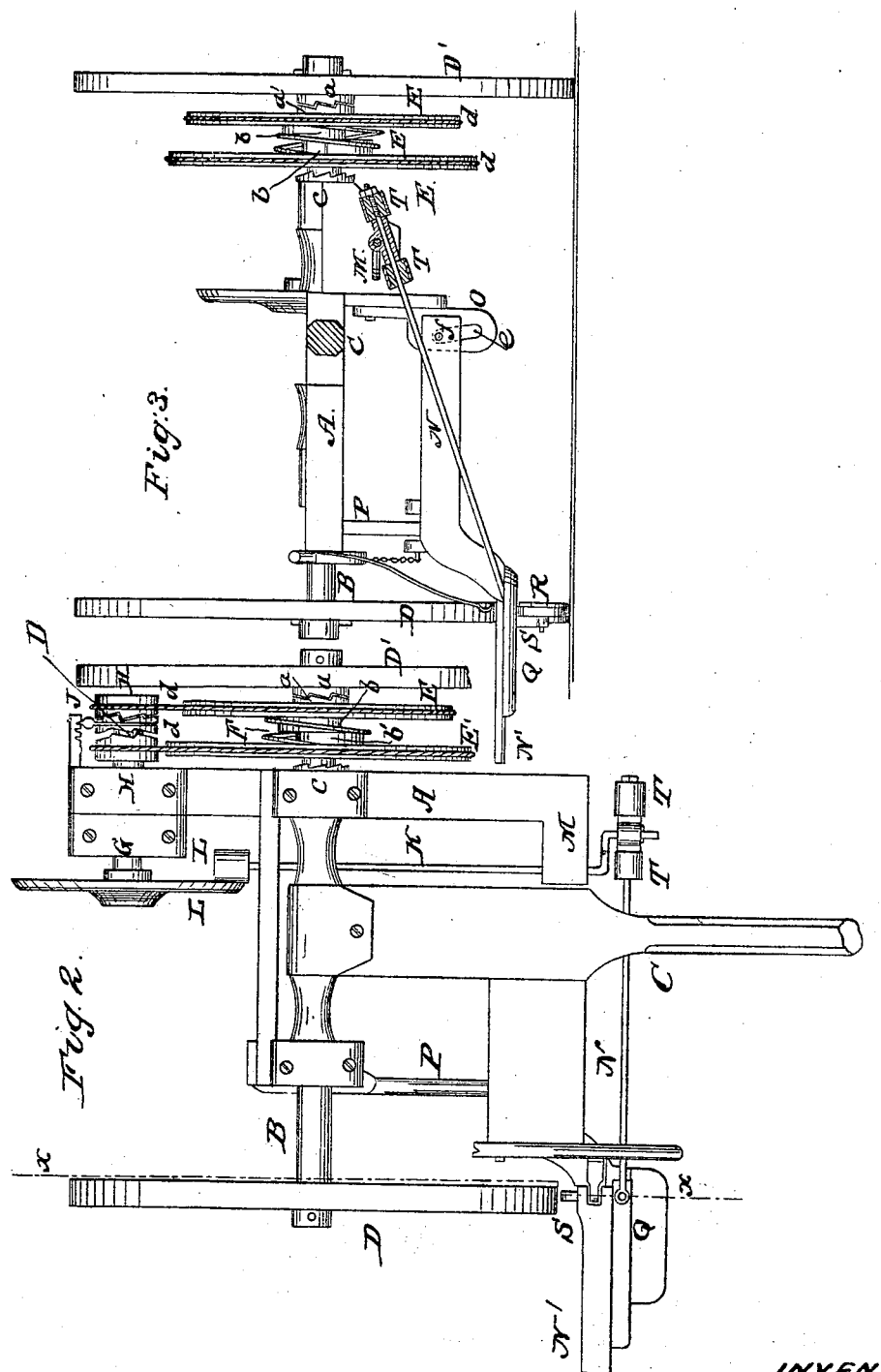

UNITED STATES PATENT OFFICE.

VIRGIL W. BLANCHARD, OF BRIDPORT, VERMONT.

IMPROVEMENT IN HARVESTERS.

Specification forming part of Letters Patent No. 50,441, dated October 17, 1865.

*To all whom it may concern:*

Be it known that I, VIRGIL W. BLANCHARD, of Bridport, in the county of Addison and State of Vermont, have invented a new and Improved Grass and Grain Harvester; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\,x$, Fig. 2; Fig. 2, a plan or top view of the same; Fig. 3, a front view of the same, partly in section.

Similar letters of reference indicate like parts.

This invention relates to an improved arrangement in the means employed for driving the sickle, whereby the speed of the latter may be varied; and the invention also relates to the arrangement of cushions or springs applied to the pitman for the purpose of avoiding jars, concussions, and the wear and tear attending the same.

The invention further relates to an improved application of a truck-wheel to the machine for the purpose of lessening the friction of the friction-bar in its passage over the ground.

A represents the main frame of the harvester; B, the axle, and C the draft-pole connected to the latter.

D D' are the supporting-wheels, or those on which the machine is mounted. The wheel D' is placed loosely on the axle B, and on the axle, by the side of wheel D', there are also placed loosely two wheels, E E', of different diameter, (shown clearly in Figs. 2 and 3.) The wheel D is secured on the axle B and turns with it. The smaller wheel, E, is connected with the wheel D' by means of a ratchet-clutch composed of two parts, $a\,a'$, one of which is on wheel D' and the other on the wheel E. The two wheels E E' have a similar clutch, the two parts $b\,b'$ of which are shown in Figs. 2 and 3, while the larger wheel, E', is connected with the axle B by similar clutch, $c$, which is shown in the same figures. Between the two wheels E E' there is a spiral spring, F, which has a tendency to keep the smaller wheel, E, connected with the drive-wheel D' and the larger wheel, E', connected with the axle B. The machine in backing will not communicate motion to either of the wheels E E'; but during the forward motion of the machine will be communicated to both of the wheels E E', provided the parts $a\,a'\,b\,b'$ of the clutches of said wheels are in gear or contact.

At the back part of the main frame A there is a shaft, G, which has two pulleys, H H', placed loosely upon it, and these pulleys may be of the same or different diameters; and either of these pulleys may be connected with the shaft G by means of a clutch, I, of ratchet form, as shown in Fig. 2, said clutch being operated by a lever, J. The shaft G gives motion to a shaft, K, through the medium of the bevel-gear L, said shaft having a longitudinal position in the main frame, with a crank, M, at its front end to give reciprocating motion to the sickle through the medium of a pitman, N.

From the above description it will be seen that by shifting the clutch I motion may be communicated to the shaft G from either the small wheel, E, or large wheel, E', according to the speed required to be given the sickle; and it will also be seen that the same end may be attained by adjusting the wheels E E' on the axle B, so as to connect and disconnect the respective clutches described in connection with said wheels. Any suitable lever arrangement may be employed for adjusting the wheels E E'.

Although belts $d$ are shown for communicating motion from the wheels E E' to the pulleys H H', still gearing may be employed instead, and probably would be preferable in practice; but in theoretical point of view they are equivalents.

N' represents a finger-bar, the inner part of which extends underneath the draft-pole, and is formed or provided with a mortise to receive loosely a pendant, O, from the draft-pole, which has an oblique slot, $e$, made in it, through which a pin, $f$, in the finger-bar passes. (See Fig. 3.) A similar connection is made between the finger bar and a brace, P, attached to the main frame, the lower end of said brace having a slot, $g$, made in it, through which a pin, $h$, in the finger-bar passes. (See Fig. 1.) By this arrangement it will be seen that a loose joint-connection is obtained between the finger-bar and the framing of the machine, which admits of the cutter-bar rising and falling freely to accommodate itself to the inequalities of surface over which it may pass; and on account of the finger-bar extending inward so far from the shoe Q, which is at the usual point, the finger-bar may be counterpoised or be nearly equal in weight at both sides of the shoe.

R is a small wheel, which is connected by a spring, S, to the finger-bar in line with the shoe Q and wheel D. (See Fig. 1.) This wheel R, in connection with the manner in which the finger-bar is hung and arranged, obviates much friction. The weight of the finger-bar is principally thrown on the wheel R, and the draft of the machine rendered comparatively light.

The pitman N has cushions or india-rubber or other suitable springs, T T, upon it, one at each side of the crank-connection, as shown clearly in Figs. 2 and 3. The cushions or springs cause the pitman to work very smoothly, all jars and concussions are avoided, and consequently much wear and breakage which frequently attend the operation of the ordinary crank mechanism in harvesters.

I claim as new and desire to secure by Letters Patent—

1. The combination of the two wheels E E, of unequal diameter, the spring F, clutches $a\ b$ I, and wheels or pulleys H H', all constructed and arranged to operate substantially as set forth.

2. The arrangement of the springs T T on each side of the crank-box at the upper end of the pitman N, for the purpose specified.

3. The combination of the wheel R and spring S, when arranged in line with the shoe Q and wheel D, as and for the purposes set forth.

4. The combination of the counterpoise-bar N, pendant O, brace-bar P, and loose joints $e\ f\ g\ h$, arranged and operating substantially as and for the purposes set forth.

VIRGIL W. BLANCHARD.

Witnesses.
T. S. ELDRIDGE,
LUTHER SMITH.